UNITED STATES PATENT OFFICE.

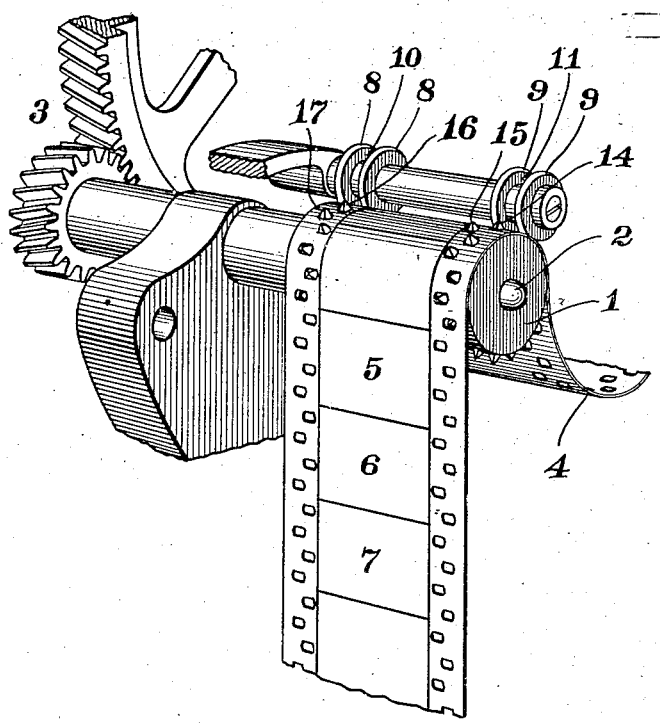
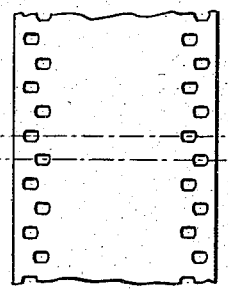
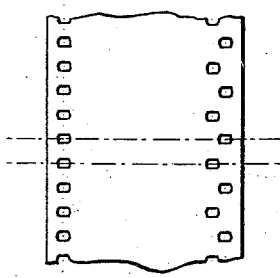
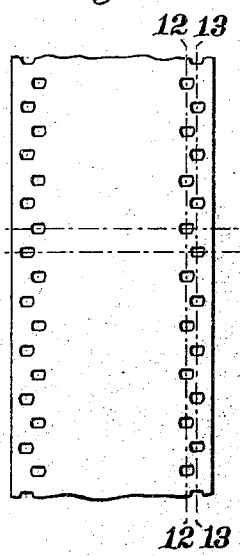

CHARLES B. REARICK, OF NEW YORK, N. Y., ASSIGNOR TO AUSTIN D. BRIXEY, OF NEW YORK, N. Y.

MOVING-PICTURE FILM.

1,255,338.  Specification of Letters Patent.  Patented Feb. 5, 1918.

Application filed September 24, 1914. Serial No. 863,376.

*To all whom it may concern:*

Be it known that I, CHARLES B. REARICK, citizen of the United States, and resident of the city of New York, in the county of New York and State of New York, have invented certain new and useful Improvements in Moving-Picture Films, of which the following is a specification.

The present invention relates to films for moving picture machines and operating means therefor.

Ordinarily the films of moving picture machines are perforated along their edges and the rollers or wheels over which they pass are provided with projections adapted to register with the perforations.

It is an object of the present invention to provide an improved film and coöperating sprocket or sprockets having the perforations so arranged and constructed that the ordinary film having a single row or line of perforations along each edge or any other film differing from the improved construction is prevented from being used in a machine adapted for the improved film. The substitution of inflammable or otherwise inferior films is prevented.

A further object of the invention is to strengthen the film construction.

Other and ancillary objects of the invention will appear hereinafter.

In the accompanying drawings, which illustrate the invention.

Figure 1 is a perspective view of a film and manipulating mechanism showing the manner of coöperation of the sprocket with the film;

Fig. 2 is a plan view of a flat section of a film, the same as shown in Fig. 1; and Fig. 3 is a view similar to Fig. 2 of a modified structure of film.

Fig. 4 is a view of a modified structure of film.

Referring to the drawings and first to Figs. 1 and 2, the sprocket 1 is driven by a suitably mounted rotatable shaft 2 which may be driven from the driving mechanism of the motion picture machine by any suitable means, as for instance the gears 3. Passing over the sprocket wheel is a film 4 having successive picture spaces 5, 6, 7, etc. In each of these spaces is a picture and the succeeding pictures are so related to each other so as to produce the appearance of motion in a picture on the screen as is well-known in connection with moving picture machines. Along each edge of the film extends a set of perforations with which the projections on the sprocket wheel are adapted to register and, entering the perforations, insure positive driving and prevent slipping. In practice a number of such sprocket wheels are provided throughout the machine to guide and drive the film at desired points. The showing of the manner of the application of the film to one of such sprocket wheels serves, however, to illustrate the manner in which it is applied to all. A further illustration would simply extend the drawings and description without making the matter clearer. The film is held upon the sprocket wheel or roller by means of rotating wheels 8 and 9 having channels or grooves 10 and 11 which permit the sprockets to pass and at the same time hold the film snugly to the roller.

Referring now particularly to Fig. 2, it will be seen that the perforations along the right hand side of the film are arranged in two lines 12—12 and 13—13 and that there is a similar arrangement along the left hand edge of the film. It will be further observed that each perforation of an inside row along one edge is directly opposite, that is, is on the same transverse line as the perforation of the inside row upon the opposite edge. Similarly, a perforation of the outside row on one edge is directly opposite the perforation of the inside row on the opposite edge. Also considering the set of perforations along one edge of the film, it will be seen that they are not in a straight line, but that they are staggered with relation to each other. It will be seen that the sprocket wheel is provided with teeth or perforations to register with these perforations, there being an outside row 14 and an inside row 15 arranged circumferentially of the roller at one end, while at the other end are inner side row 16 and an outside row 17.

It will be observed that with this construction and arrangement of perforations that those perforations which are in a straight longitudinal line with each other, are twice as far apart as if all of the perforations were in a straight line. This provides twice as much material in the line of pull of a sprocket on the film and therefore the strength of the film is enhanced. Furthermore, since for every perforation upon one side there is a perforation on the other, there will always be a pull on one side of the film when there is a pull upon the other, so that the pull upon the film as a whole will be even and distortion of the film prevented. This is accomplished without sacrificing any of the perforations per unit of length of the film. It is well known to film operators that a film wears out because of the pull of the sprocket teeth against the sides of the perforations, these sides eventually so wearing or tearing that the film is no longer useful. In the usual standard form of film, the perforations being in a single row along each edge, they are placed as close together as is consistent with strength of material between them so that as many teeth as possible engage the film. This divides the pull and reduces the stress on any one perforation side. The film of the present invention maintains the frequency of the perforations longitudinally of the film, thereby reducing the pull per tooth to a minimum as described and at the same time attains the other advantages mentioned. As to prevention of substitution of films, if a sprocket is adapted to coöperate with a film of Figs. 1 and 2, an ordinary film cannot be used on the sprocket, for the reason that the ordinary film would have its perforations spaced longitudinally by about the same distance as the sprocket teeth, but the film perforations would be in a straight line. The result would be that in the row of perforations of the ordinary film, the sprockets might engage every other perforation, but for the other row of sprocket teeth on that edge of the film there would be no perforations at all. This would cause the film to be punched and damaged by the sprocket teeth and prevent its practical use. The film and sprocket wheel of Figs. 1 and 2 might be so dimensioned that the distance between the rows of perforations on the two edges in the ordinary film would be such as to bring the row on each side between the inner and outer rows of sprocket teeth. There would then be no perforations for any of the sprocket teeth to engage in, which would have a tendency to tear out the holes in the film and its satisfactory operation would be prevented. In any event, no satisfactory operation of the ordinary film on the sprocket adapted to coöperate with the improved film could be secured.

Fig. 3 shows a film similar to Fig. 2, but differing, in that instead of having inside holes opposite each other and outside holes opposite each other transversely of the film, in Fig. 3 an inside hole has directly opposite an outside hole. Of course where this film is used the teeth on the sprocket wheels would be arranged to properly register with the holes.

Fig. 4 shows a film similar to that shown in Figs. 2 and 3 in that it makes use of the plurality of rows of perforations staggered along one edge, but differing therefrom in that there is a single row of perforations along one edge; the perforations on the two edges are, as in the other figures, directly opposite each other. With this film, as with the others, the sprocket teeth are arranged to register with the film perforations.

While the invention has been described in what is considered its best applications, it may have other embodiments without departing from its spirit and is therefore not limited to the structures shown in the drawings.

I claim and desire to obtain by Letters Patent the following:

1. A moving picture film having perforations staggered with relation to each other along one edge and perforations along the other edge.

2. A moving picture film having perforations staggered with relation to each other along one edge and perforations along the other edge directly opposite perforations along the first mentioned edge.

3. A moving picture film having a plurality of rows of perforations along one edge, the perforations of one row being staggered with relation to the perforations of the other row, and perforations along the other edge.

4. A moving picture film having perforations staggered with relation to each other along each side.

5. A moving picture film having perforations staggered with relation to each other along each side, perforations of one edge being directly opposite perforations along the other edge.

6. A moving picture film having along each edge a plurality of rows of perforations, the perforations of one row being staggered with relation to the other.

7. A moving picture film having along each edge an inner and an outer row of perforations, one row being staggered with relation to the other and the perforations of the inner rows on the two edges being directly opposite each other.

8. A moving picture film having along each edge an inner and an outer row of perforations, one row being staggered with relation to the other and the perforations of the outer rows on the two edges being directly opposite each other.

Signed at borough of Manhattan, in the county of New York and State of New York this 22nd day of September A. D. 1914.

CHARLES B. REARICK.

Witnesses:
FLORENCE G. TUCKER,
ELSIE E. LYNCH.